(12) United States Patent
Kim et al.

(10) Patent No.: US 8,127,250 B2
(45) Date of Patent: Feb. 28, 2012

(54) METHOD FOR DISPLAYING MENU ITEMS IN A MOBILE DEVICE

(75) Inventors: Tae Hyoung Kim, Seoul (KR); Yu Chan Byun, Kyonggi-do (KR); Jin Soo Lee, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 932 days.

(21) Appl. No.: 11/682,957

(22) Filed: Mar. 7, 2007

(65) Prior Publication Data

US 2007/0157121 A1    Jul. 5, 2007

Related U.S. Application Data

(63) Continuation of application No. 11/549,629, filed on Oct. 13, 2006, now Pat. No. 7,861,184, which is a continuation of application No. 09/737,283, filed on Dec. 15, 2000, now Pat. No. 7,137,073.

(30) Foreign Application Priority Data

Dec. 18, 1999   (KR) .................................. 1999-59083
Dec. 13, 2000   (KR) .................................. 2000-75956

(51) Int. Cl.
*G06F 3/048*   (2006.01)
(52) U.S. Cl. ...................................................... 715/811
(58) Field of Classification Search .................. 715/841, 715/811, 854, 825, 826
See application file for complete search history.

(56) References Cited

U.S. PATENT DOCUMENTS

| | | | |
|---|---|---|---|
| 5,420,975 A | 5/1995 | Blades et al. | |
| 5,445,852 A | 8/1995 | Sugai | |
| 5,455,852 A | 10/1995 | Elrod et al. | |
| 5,488,650 A | 1/1996 | Greco et al. | |
| 5,572,648 A | 11/1996 | Bibayan | |
| 5,732,338 A | 3/1998 | Schwob | |
| 5,784,059 A | 7/1998 | Morimoto et al. | |
| 5,815,142 A * | 9/1998 | Allard et al. | 345/173 |
| 5,821,936 A | 10/1998 | Shaffer et al. | |
| 5,943,055 A | 8/1999 | Sylvan | |
| 5,999,228 A * | 12/1999 | Matsuura et al. | 348/569 |
| 6,047,197 A * | 4/2000 | Jarrad | 455/566 |
| 6,049,336 A | 4/2000 | Liu et al. | |
| 6,121,968 A * | 9/2000 | Arcuri et al. | 715/825 |

(Continued)

FOREIGN PATENT DOCUMENTS

CN   1123996   6/1996

(Continued)

*Primary Examiner* — Thanh Vu
(74) *Attorney, Agent, or Firm* — Lee, Hong, DeGerman, Kang & Waimey

(57) ABSTRACT

The method for managing menu functions in a mobile station includes the steps of executing menu edition, selecting menu items the user uses frequently in the executed menu edition, to set up a menu, executing the menu, and displaying the menu of the selected menu items at first. The basic menu inclusive of all menu items the mobile station provides is selected as a last menu item of the mode menu displayed at first so that the user can access to menu items other than the menu items of preference. By providing easy mode menu with menu items the user or manufacturer of the mobile station uses frequently in advance, and displaying on a display window at first, the user is permitted a quick and easy access to a desired menu item without going through many steps of menus for using the desired menu item.

23 Claims, 7 Drawing Sheets

U.S. PATENT DOCUMENTS

| | | | |
|---|---|---|---|
| 6,122,530 A | 9/2000 | Overy et al. | |
| 6,133,915 A | 10/2000 | Arcuri et al. | |
| 6,144,863 A | 11/2000 | Charron | |
| 6,160,552 A | 12/2000 | Wilsher et al. | |
| 6,188,406 B1 * | 2/2001 | Fong et al. | 715/810 |
| 6,211,870 B1 * | 4/2001 | Foster | 715/744 |
| 6,232,972 B1 | 5/2001 | Arcuri et al. | |
| 6,263,217 B1 * | 7/2001 | Park | 455/566 |
| 6,266,060 B1 | 7/2001 | Roth | |
| 6,408,191 B1 | 6/2002 | Blanchard et al. | |
| 6,417,874 B2 | 7/2002 | Bodnar | |
| 6,437,836 B1 * | 8/2002 | Huang et al. | 348/734 |
| 6,463,304 B2 * | 10/2002 | Smethers | 455/566 |
| 6,512,525 B1 * | 1/2003 | Capps et al. | 715/762 |
| 6,580,442 B1 | 6/2003 | Singh et al. | |
| 6,697,569 B1 | 2/2004 | Gomez et al. | |

FOREIGN PATENT DOCUMENTS

| | | |
|---|---|---|
| CN | 1168591 | 12/1997 |
| EP | 0840504 A1 | 5/1998 |
| EP | 0844553 | 5/1998 |
| EP | 0891066 A2 | 1/1999 |
| KR | 10-0200958 | 6/1999 |
| WO | WO 00/55717 | 9/2000 |

* cited by examiner basic menu ⟶ volume { bell  ☑ — 401
                     volume of key tone ☐ basic menu ⟶ bell { bell     ☑ — 402
                    melody   ☐
                    vibration ☐ basic menu ⟶ scheduling { present time setting ☐
                          total communication of ☑ — 403
                          time period

⋮              ⋮ basic menu ⟶ convenient functions { automatic area code ☑ — 404
                                    power save          ☐
                                    automatic reception ☐
                                    calculator          ☑ — 405

METHOD FOR DISPLAYING MENU ITEMS IN A MOBILE DEVICE

CROSS-REFERENCE TO RELATED APPLICATIONS

This application is a continuation of U.S. application Ser. No. 11/549,629, filed Oct. 13, 2006, now U.S. Pat. No. 7,861,184, issued Dec. 28, 2010, which is a continuation of U.S. application Ser. No. 09/737,283, filed Dec. 15, 2000, now U.S. Pat. No. 7,137,073, issued Nov. 14, 2006, which pursuant to 35 U.S.C. §119(a), claims the benefit of earlier filing date and right of priority to Korean Application Nos. 1999-59083, filed on Dec. 18, 1999, and 2000-75956, filed on Dec. 13, 2000, the contents of which are hereby incorporated by reference herein in their entirety.

BACKGROUND OF THE INVENTION

1. Field of the Invention

The present invention relates to a method for managing menu functions in a mobile station.

2. Background of the Related Art

The recent remarkable developments in the fields of information and communication have changing the information and communication environments rapidly. Particularly, it is recent trend that a number of users of the portable mobile stations keep increasing day by day, and keeping pace with this, a demand for the mobile station also is increasing. On the other hand, for providing convenience to the users, there are new functions added to the mobile station, and there have been ceaseless researches for the new functions. The mobile station is provided with the telephone function without question, and message transmission/reception functions, data storage function, functions for receiving various teletext services, such as weather, and security information, and the like. And, recently the mobile station is provided with even the Internet function.

In the meantime, a menu function for managing the various functions of the mobile station are operative in a form of "hierarchical optimum menu". The hierarchical optimum menu, menus produced at the time of production of the mobile station and stored in the mobile station, denotes a hierarchical architecture of the menus. That is, if it is intended to use one menu, it is required to go through a few steps. The hierarchical optimum menu has a pop-up form of hierarchical architecture. In detail, one main menu has its submenus, and each of the submenus has its submenus, to require step by step approach to access to one of the submenus. As explained keeping pace with the provision of the various function to the mobile station, a system program for operating the mobile station also becomes complicated as much. And, as an architecture of a menu for managing such numerous additional functions of the mobile station also becomes complicated, the users are also required to be familiar with the architecture of the numerous additional functions as well as methods for using the menu functions which manages the menus.

A related art method for managing the menu functions will be explained, with reference to FIG. 1. It is assumed that the user intended to use a calculation function in the mobile station.

Referring to FIG. 1, at first, the user presses a menu button on a key panel in the mobile station, when a display window (in general, a liquid crystal display) of the mobile station displays basic menu items provided basically by the mobile station, for an example, such as 1. Volume control 101, 2. Telephone bell selection 102, 3. Scheduling 102, 4. Scheduled operation/alarm (not shown), 5. Password 104, 6. Convenient functions 105, 7. Locking 106, and the like.

However, when the menu button is pressed on the key panel, there is a limitation of a number of menu items displayable on the display window owing to a limited area of the display window of the mobile station. In general, two or three menu items can be displayed on the display window. Therefore, upon pressing the menu button, if a desired item is not displayed on the display window, the user operates cursor moving buttons on the key panel, to move the cursor to the desired menu item, such as "6. Convenient functions 105". As explained, upon moving down the cursor, the menu item "6. Convenient functions 105 is displayed on the display window, and upon selection of the menu item 6., submenus of the menu item are displayed on the display window. For an example, it is assumed that the submenus of the menu item 6 has 1. Automatic area code 107, 2. Power saving 108, 3. Automatic reception 109, and 4. Calculator 110. If there is no "4. Calculator 110" item in the submenu items displayed on the display window at first as explained, the user operates the cursor moving buttons on the key panel, to move the cursor to the next submenu items. When the user selects the "4. Calculator 110" item, the calculator function is retrieved, to permit the user to use the calculator function of the mobile station.

In the meantime, if the user remembers respective submenu numbers displayed on the display window when the user presses the menu button, it is not required to press the operation of key panel buttons until the intended submenu items are displayed. However, it is difficult for the user to remember all numerous main menu items and the submenu items of respective main menu items, actually. Even if the user searches the main menu items and the submenu items displayed on the display window for the desired submenu item, without remembering the submenu items, there is still a problem in that the user is required to know the desired function falls on which submenu item. Therefore, the user is required to repeat a process in which the search proceeds to upper menu items, and then proceeds to lower menu items of the upper menu item, for a few times. In other words, if the user does not know that the 4. Calculator 108 function is in the item of 6. Convenient functions 105 in advance, the user can not but waste much time in search for a submenu item for the calculator. That is, in order to reach to a desired submenu item, many times of operation on the key panel buttons is required, and many toggles should be attempted. For example, in order to reach to a seventh submenu item "screen luminance adjustment" under a fifth main menu item "mobile station managing", the user is required to press the key panel buttons more than ten times in total. That is, in order to reach to the fifth main menu item, a four time of button pressing is required, and then, in order to reach to the seventh submenu items, a six times of button pressing is required, again.

As explained, the hierarchical optimum menu architecture becomes very complicate as many new functions are developed, and many menu items are produced for managing the new functions, to require for the user to waste much time because it is required to go through many steps to reach to the desired menu item. Moreover, the hierarchical optimum menu architecture has many items which are not used by the user depending on the user, that causes the problem that too many steps are required to reach to some of actually desired menu items.

SUMMARY OF THE INVENTION

Accordingly, the present invention is directed to a method for managing menu functions in a mobile station that substantially obviates one or more of the problems due to limitations and disadvantages of the related art.

An object of the present invention is to provide a method for managing menu functions in a mobile station, which permits an easy access to a user desired menu item.

Additional features and advantages of the invention will be set forth in the description which follows, and in part will be apparent from the description, or may be learned by practice of the invention The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for managing menu functions in a mobile station, include the steps of selecting only menu items of preference from basic menu items stored in a mobile station in advance. An easy (EZ) mode menu of the selected items is set up in advance. The menu items of the easy mode menu are displayed on the display window of the mobile station at first in using menu functions of the mobile station. The user selects a desired menu item from the displayed EZ mode menu items.

The EZ mode menu of menu items of preference may be fabricated by the manufacturer at a stage of development of the mobile station, together with a basic menu.

The EZ mode menu of menu items of preference may be fabricated by the user after fabrication of the mobile station in a process of menu edition.

The user may selects menu items the user uses frequently as the items of the EZ mode menu in the process of menu edition.

Or, the user may selects the EZ mode menu of menu items of preference from statistics of menu items recently used frequently by the mobile station in the process of menu edition.

In another aspect of the present invention, there is provided a method for managing menu functions in a mobile station, including the steps of (1) selecting only menu items of preference from basic menu items of a mobile station, to fabricate an easy (EZ) mode menu, and (2) displaying menu items of the easy made menu on the display window of the mobile station at first in using menu functions of the mobile station.

The basic menu inclusive of all menu items the mobile station provides is selected as a last menu item of the mode menu displayed at first so that the user can access to menu items other than the menu items of preference.

By providing easy mode menu with menu items the user or manufacturer of the mobile station uses frequently in advance, and displaying on a display window at first, the user is permitted a quick and easy access to a desired menu item without going through many steps of menus for using the desired menu item.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

A method for managing menu functions in a mobile station of the present invention includes the steps of selecting desired menu items only from basic menu items of a mobile station to fabricate an easy made menu, and, in carrying out menu functions of the mobile station, displaying the menu items of the easy mode menu at first on the display window of the mobile station.

Figure 2:
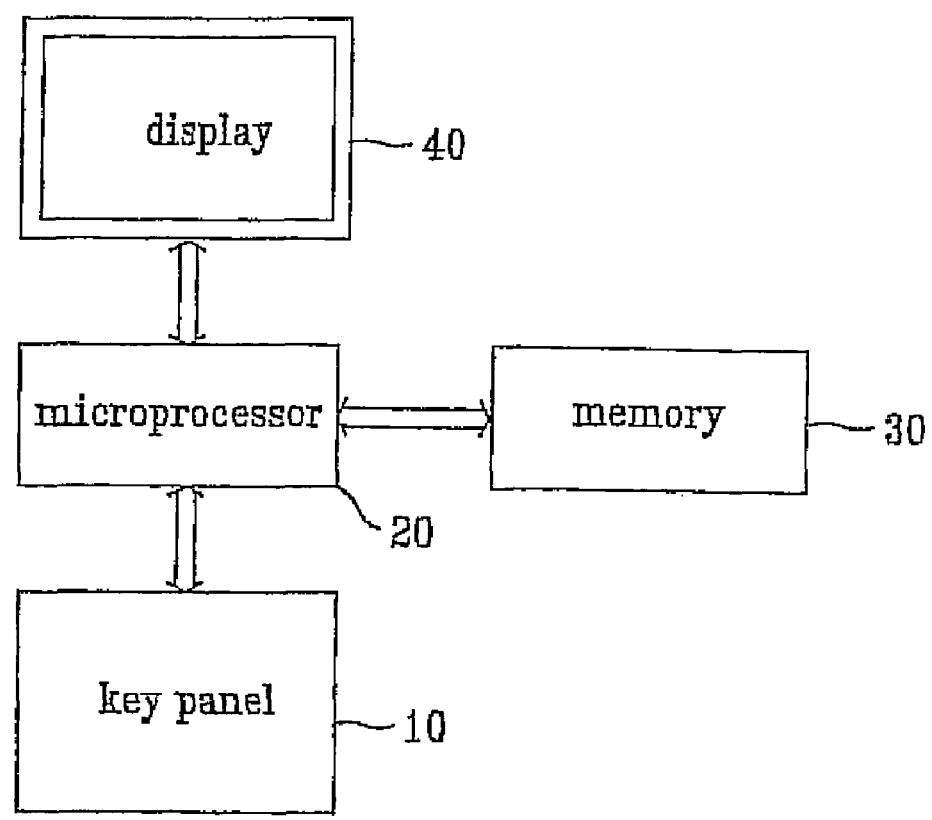
FIG. 2 illustrates a block diagram showing a system of a mobile station for explaining a method of the present invention.
Figure 3A:
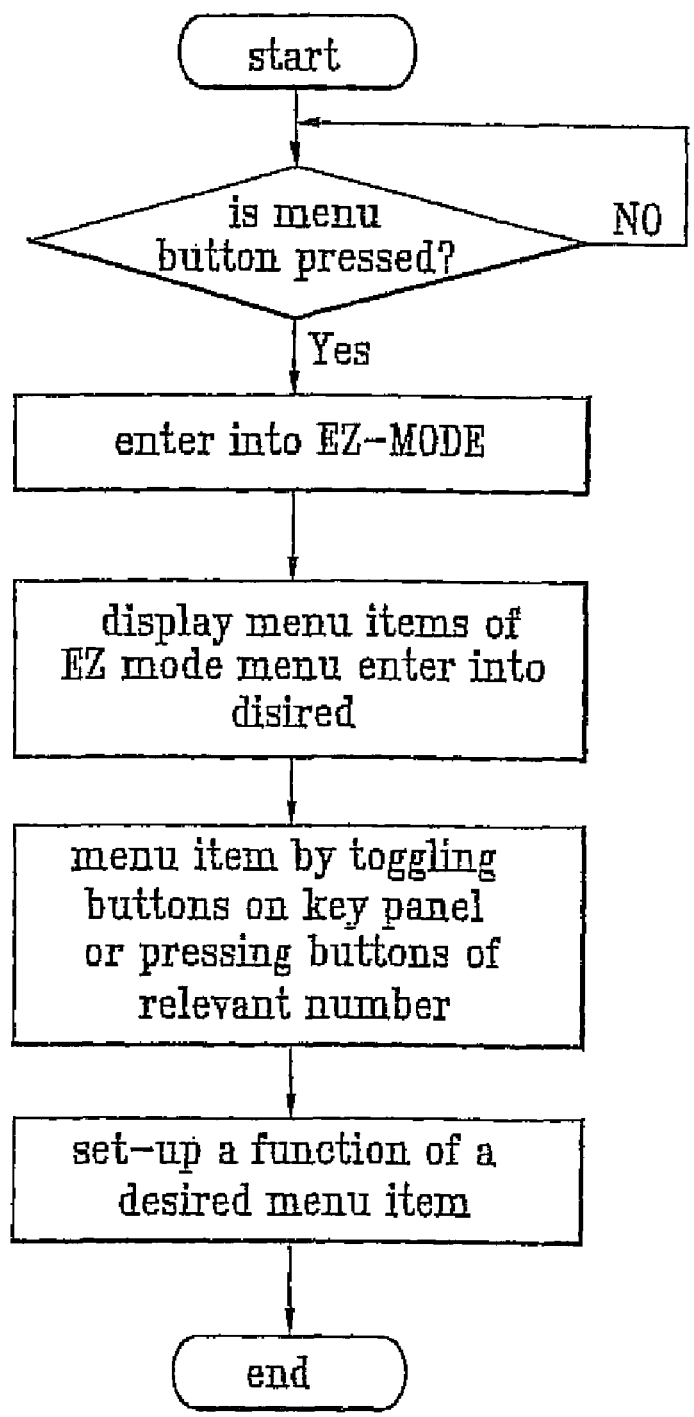
FIG. 3A illustrates a flow chart showing the steps of a method for managing menu functions in a mobile station in accordance with a first preferred embodiment of the present invention.

FIG. 2 illustrates a block diagram showing a system of a mobile station for explaining a method of the present invention, and FIG. 3A illustrates a flow chart showing the steps of a method for managing menu functions in a mobile station in accordance with a first preferred embodiment of the present invention.

The method for managing menu functions in a mobile station in accordance with a first preferred embodiment of the present invention will be explained, with reference to FIGS. 2 and 3.

Referring to FIG. 2, the mobile station includes a key panel 10 having a plurality of buttons for generating a key signal by a user, a microprocessor 20 for controlling entire system of the mobile station in response to the key signal from the key panel 10, a memory 30 for storing, and providing system programs and required information under the control of the microprocessor 20, and a display (in general, liquid crystal display) 40 for displaying information read by the microprocessor 20. First the step of selecting desired menu terms only from basic menu items of a mobile station to fabricate an easy mode menu, which is a main characteristic of the present invention will be explained. There are two methods in selecting user desired menu items.

In the first method, the easy (or EZ) mode menu having the menu items of the user's preference is fabricated by a user's edition of the menu after fabrication of the mobile station. The user may selects the menu items the user uses frequently as the EZ mode menu items in a process of the menu edition, or the user may selects the menu items with reference to statistics of menu items used recently for many times in the mobile station as the EZ mode menu items in a process of the menu edition. That is, when the user intends to fabricate the EZ menu of the mobile station, the user presses a menu button on the key panel 10 for an elongated time in a range of 2~3 seconds, to display main menu items of basic menu stored already in the mobile station on a display window of the display. Then, when the user selects any one of main menu items in the basic menus by moving cursor by using a cursor moving button on a key panel 10, submenu items for the selected main menu item is displayed on the display window. In this instance, there are a check box for determining selection of the submenu at a side of each of the submenus. When the user puts a check mark in the check box by operating the buttons, the submenu item is selected as an EZ menu item. All the menu items can be checked, inclusive of menu items with or without submenus. For an example, a submenu item for a function (for an example, "calculator" item), or a main menu item (for an example, "convenient function" item) containing the submenu item ("calculator" item) may be selected as a menu item of the EZ menu. After selecting a desired menu item (or items) from the submenu items of one main menu item, the user operates the buttons of the key panel 10, either for returning to the main menu level for selecting another menu item, or finishing the menu editing process for selecting the EZ menu items.

Figure 4:
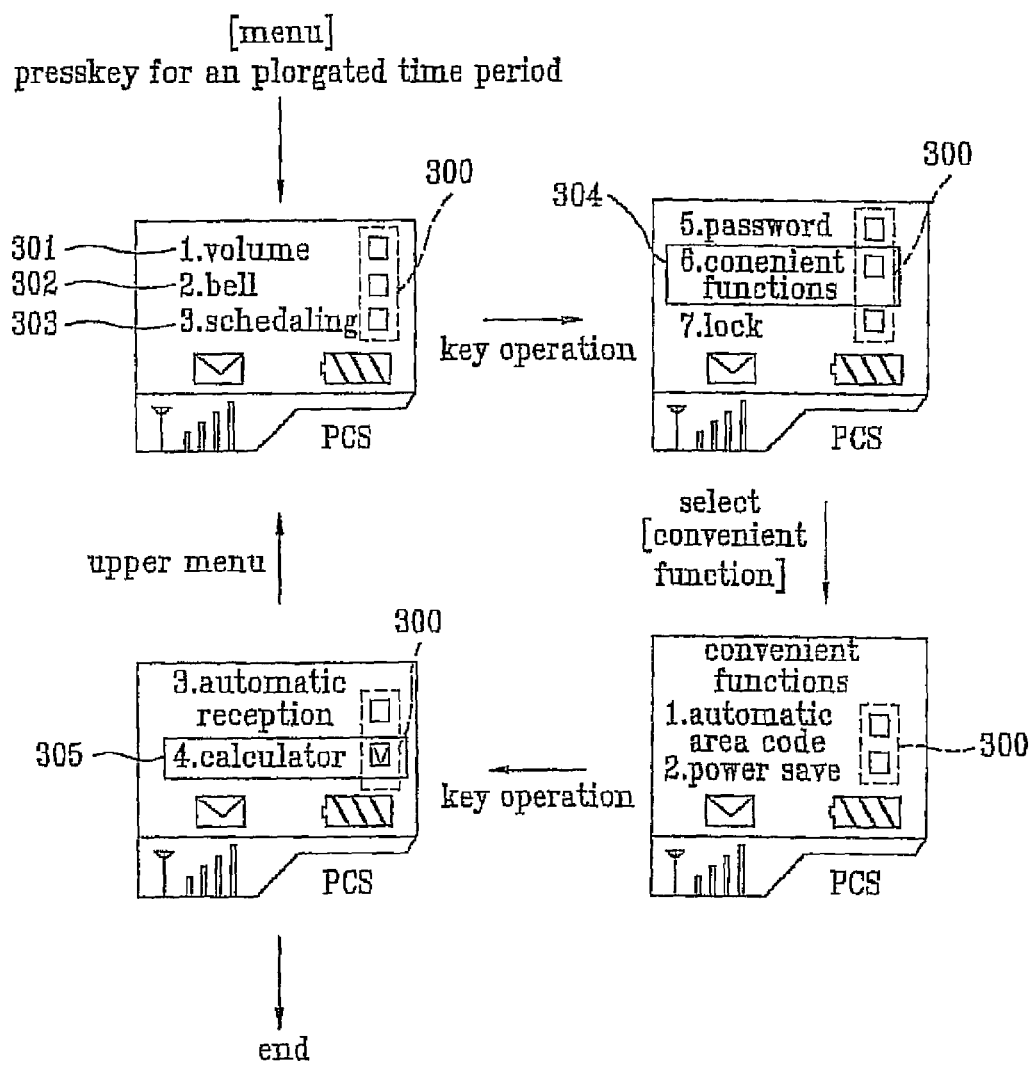
FIG. 4 illustrates a diagram showing a process for selecting a desired menu item from basic menu items in a mobile station by user in accordance with a preferred embodiment of the present invention.
Figures 5A, 5B:
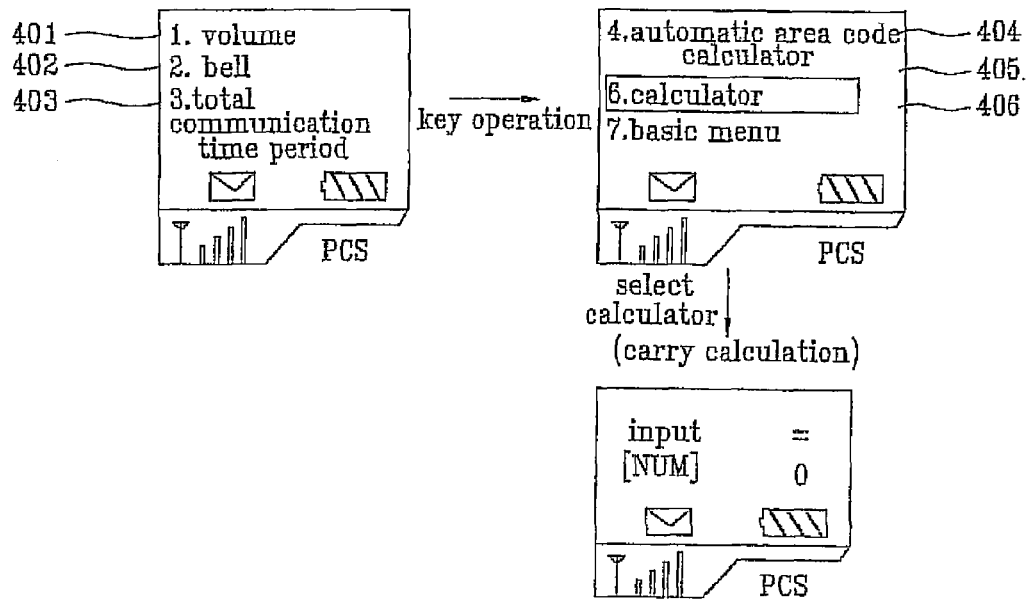
FIG. 5A illustrates a diagram showing menu items selected as EZ menu on a display window of a mobile station in accordance with a preferred embodiment of the present invention.
FIG. 5B illustrates a diagram showing a process for executing a menu item functions selected by the user from EZ menu items; and, FIG. 6 illustrates EZ menu items displayed in forms of icons on a display window in accordance with another embodiment of the present invention.

FIG. 4 illustrates a diagram showing a process for selecting a desired menu item from basic menu items in a mobile station by a user in accordance with a preferred embodiment of the present invention, and FIG. 5A illustrates a diagram showing menu items selected as EZ menu on a display window of a mobile station in accordance with a preferred embodiment of the present invention, referring to which the first selecting process will be explained in more detail.

If the user intends to selects "calculator" menu item, the menu editing process is started with pressing the menu button for an elongated time of 2~3 seconds. In this instance, 1. Volume control 301, 2. Telephone bell selection 302, 3. Scheduling 303 are displayed on the display window, with a check box 300 at a side of each of the main menu items for determining selection of the main menu items. In this instance, since the main menu item of 6. Convenient functions 304 containing the submenu item of "Calculator" is not displayed on the display window, the user operates the buttons, to move the cursor to the sixth main menu item of the "6. Convenient functions 304". Then, when the user operates the buttons to select the "6. Convenient functions 304", submenu items of the sixth main menu item are displayed on the display window. The display window can display three main menu items, or two submenu items, at a time. Therefore, at first the "4. Calculator 305", the fourth submenu item is not displayed on the display window in FIG. 4. Accordingly, the user is required to operate the buttons to move the cursor to the desired submenu item, "4. Calculator". Then, the user puts the check mark in to check box 300 at the side of the item "4. Calculator 305" by using the buttons, for selecting the "4. Calculator" 305 item. If it is intended to select another menu the user may return to the main menu, the upper menu, by using the buttons. By repeating the same process, all desired menu items can be selected. Thereafter, when the menu is run (step 203), the selected items are displayed as the first submenus (step 204), to facilitate an easy access to a desired menu item.

In the second method for selecting the menu items, the EZ mode menu having the menu items of preference may be fabricated by a manufacturer of the mobile station at a stage of development of the mobile station, together with the basic menu. As explained, the selection process of the present invention forms different trees of the basic menu and the EZ mode menu given to the mobile station. In order to reach to the EZ mode menu trees, what is required is either mere pressing of a one touch button on the key panel 10, or by selection by using the buttons after the menu function is reached. That is, the EZ mode menu intends to reduce a number of user's button pressing times on the key panel 10 by making menu items not used frequently or usefully by the users of the mobile station not to be displayed on the display window, while menu items the users of the mobile station use frequently or usefully put aside.

Another example of the selection process will be explained. For an example, it is assumed that the basic menu of the mobile station has four main menu items as explained below, and each of the main menu items has a plurality of submenu items.

* Basic Menu

1. Volume, and Bell (Maim Menu Items):

Conversion between bell/vibration, selection of bells, volume of the bell, call connection sound, service change sound, one minute communication sound, automatic communication volume (submenu items).

2. Electronic Note Functions (Main Menu Item):

Recording telephone numbers, Scheduling, Schedule search, Past schedule erasure, World time, Calculator, Communication list erasure, Erasure of entire telephone numbers, Own telephone number confirmation (submenu items).

3. Management of Mobile Station (Main Menu Items):

Locking set up, Communication time period list, Password change, Area code set up, Area code input, Background illumination, Supplementary telephone numbers, Screen luminance adjustment (submenu items).

4. Data Communication (Main Menu Items):

MDR, Communication Mode Set Up (Submenu Items).

The user may erase menu items for functions not used frequently from the basic menu items, and select only menu items for functions used frequently and form a new EZ mode menu tree as described below. In a case the EZ mode menu is fabricated at a mobile station manufacturer, since the menu items used frequently may differ from user to user, functions may be added to the mobile station for erasing menu items from the EZ mode menu items, or adding new menu items to the EZ mode menu items.

An example of the EZ menu selected and fabricated by the user will be shown below.

* EZ Mode Menu

1. Volume, and Bell (Main Menu Items):

Conversion between bell/vibration, selection of bells, volume of the bell (submenu items).

2. Electronic Note Function (Main Menu Items):

Recording telephone numbers, Scheduling, Schedule search (submenu items).

3. Management of Mobile Station (Main Menu Items):

Locking set up, Communication time period list, Background illumination (submenu items).

FIG. 3A illustrates a flow chart showing the steps of a method for managing menu functions in a mobile station in accordance with a first preferred embodiment of the present invention, and FIG. 5B illustrates a diagram slowing display windows for explaining a process for managing menu functions of a mobile station by using the EZ mode menu fabricated in FIGS. 4 and 5A. The method for managing menu functions of a mobile station in accordance with a first preferred embodiment of the present invention will be explained with reference to FIGS. 5B and 3A. As explained, the present invention suggests to display menu items of easy mode menus at first on a display window of a mobile station in using the menu function of the mobile station for the convenience of the users. In this instance, as shown in FIG. 5B, a last menu item of the EZ mode menu is set up to be a basic menu inclusive of all menu items provided by the mobile station so that the user cam access to menu items other than the menu items of the EZ menus.

Figure 1:
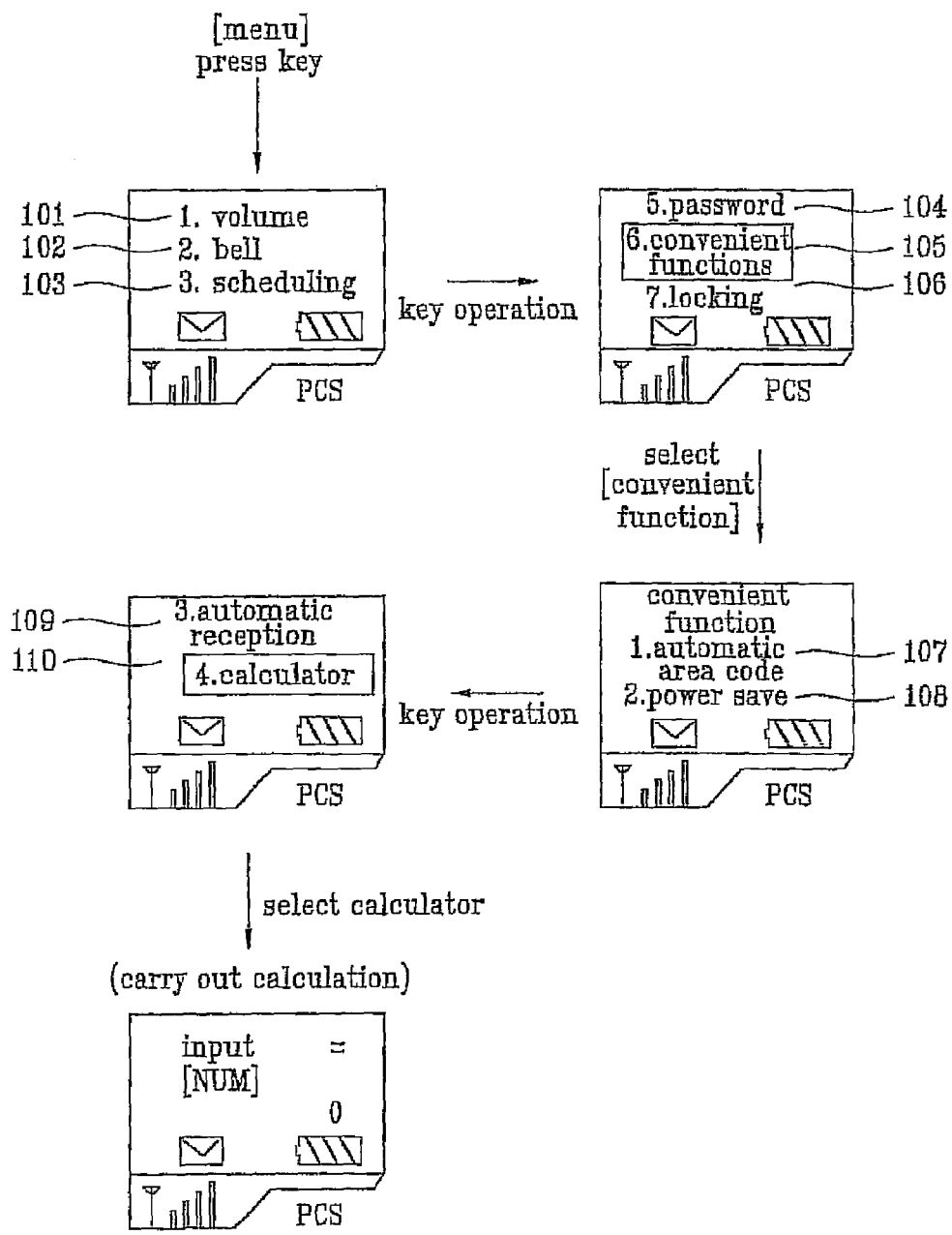
FIG. 1 illustrates a diagram showing a related art method for managing menu functions in a mobile station.

Referring to FIG. 3A, the microprocessor 20 in FIG. 2 checks the menu buttons on the key panel 10 of being pressed, to proceed to the EZ mode menu directly, if the menu buttons are pressed, when, as shown in FIG. 5B, 1. Telephone bell volume 401, 2. Bell 402, 3. Total communication time period 403, 4. automatic area code 404, 5. Calculator 405, and 6. Basic menus, of the EZ menu items fabricated in the selection process, are displayed an the display window. When the user intends to selects the menu item of "Calculator", the user may not find the item of 5. Calculator 405 from the menu items displayed at first owing to the limitation of number of menu items the display window of the mobile station can display at a time. In this instance, the user operates the buttons to move the cursor to the next EZ menu items, for selecting the menu item of 5. Calculator 405. That is, the user can move the cursor to a desired menu item by toggling the buttons on the displayed menu items, or pressing buttons of corresponding number. Then a function of the desired item is set by using a confirmation button among the buttons. Accordingly, since the menu items of the user's preference are displayed at first, different from the related art method, access to the desired menu item within a short time period is possible without going through many steps.

Figure 3B:
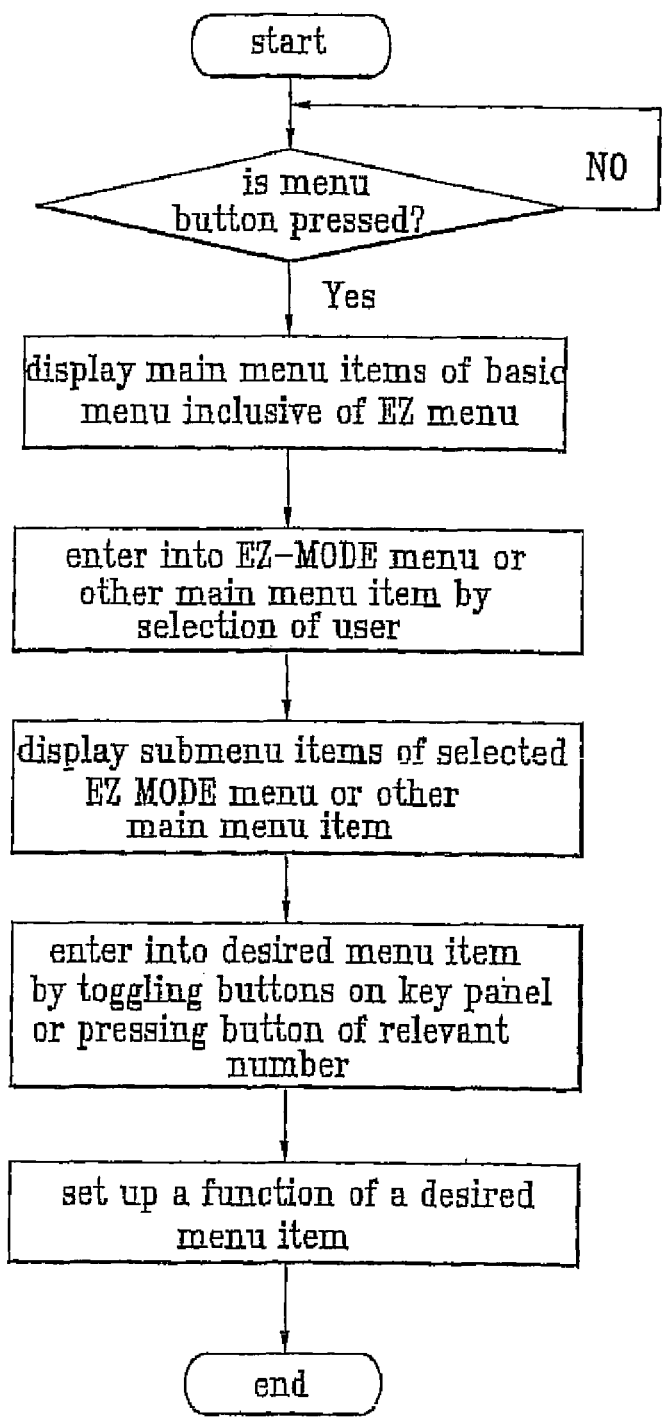
FIG. 3B illustrates a flow chart showing the steps of a method for managing menu functions in a mobile station in accordance with a second preferred embodiment of the present invention.

FIG. 3B illustrates a flow chart showing the steps of a method for managing menu function in a mobile station in accordance with a second preferred embodiment of the present invention. The method for managing menu functions of a mobile station in accordance with a second preferred embodiment of the present invention will be explained with reference to FIGS. 5B and 3B. As explained the present invention suggests to display menu items of easy mode menus at first on a display window of a mobile station in using the menu function of the mobile station for the convenience of the users. In this instance too, as shown in FIG. 5B, a last menu item of the EZ mode menu is set up to be a basic menu inclusive of all menu items provided by the mobile station so that the user can access to menu items other than the menu items of the EZ menus.

Referring to FIG. 3B, the microprocessor 20 in FIG. 2 checks the menu buttons on the key panel 10 of being pressed, to displays main menu items of the basic menu inclusive of the EZ mode menu on the display window at first if the menu buttons are pressed, when the user may operate the buttons on the key panel 10 to select the EZ mode menu or other main menu items. Once the EZ mode menu or any one main menu item is selected, the EZ menu items or submenu items of the selected main menu item are displayed on the display window. The user can move the cursor to a desired menu item by toggling the buttons on the displayed menu items, or pressing buttons of corresponding number. Then, a function of the desired item is set by using a confirmation button among the buttons. Accordingly, by setting the EZ mode menu as a first main menu item even in the basic menu, different from the related art method, access to the desired menu item within a short time period is possible without going through many steps.

Figure 6:
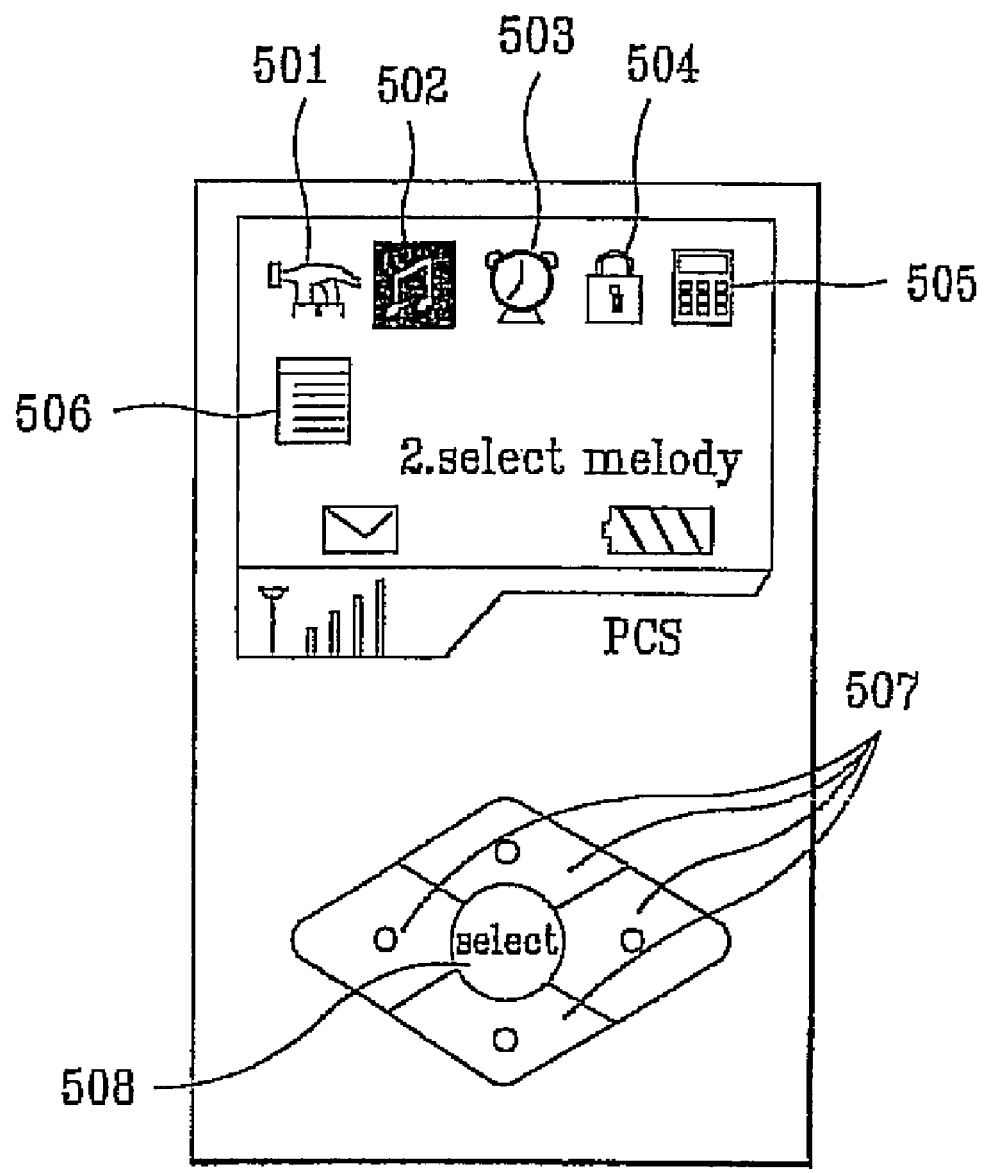

A method for managing menu functions in a mobile station in accordance with another embodiment of the present invention will be explained, with reference to FIG. 6. In this embodiment the menu items are displayed, not it character forms explained before, but in icon forms supporting graphics. FIG. 6 illustrates EZ menu items displayed in forms of icons on a display window in accordance with another embodiment of the present invention.

Referring to FIG. 6, there are icons 501~506 corresponding to respective menu items displayed on the display window, with a selected icon 502 in an inverted color. As explained, for selecting the icons, there are cursor moving buttons 507 for moving the cursor in an up, down, left or right direction, and a selection button 503 for executing the selected icon by the user on the key panel of the mobile station. And, the display window displays a menu editing icon 501 for selecting a menu editing process to fabricate the EZ menu, and an icon 506 for selecting a basic menu inclusive of menu items of all functions the mobile station provides, basically. When the user moves the cursor to the menu editing icon 501 by using the cursor moving button, and pressing the selection button 508, the menu editing process is carried out. Then, as explained, when the user selects the basic menu icon the basic menu items of character forms are displayed on the display window identical to the case of the foregoing embodiments. The process for selecting the EZ mode menu is cared out in a method identical to the menu editing process of the foregoing embodiments. When the user uses the menu functions, both the basic menu items and the EZ mode menu items displayed on the display window have the icon forms. Other than the above, the menu functions are carried out through steps identical to the two embodiments.

FIG. 6 illustrates EZ menu items displayed in forms of icons on a display window, inclusive of, basically a menu editing icon 501 and basic menu icon 506, and menu items of a melody selection 502, alarm 503, locking 504, Calculator 505 and the like provided by the menu editing process in accordance with another embodiment of the present invention, with the melody selection icon 502 selected by the user. In this embodiment too, because the menu items the user uses frequently are selected as the EZ menu items and displayed on the display window in the icon forms at first, it is convenient for the user to access to a desired menu item. Since the "basic menu icon" 506 is displayed as a last menu item of the EZ mode menu when the icons of the EZ menu items are displayed on the display window, the user can access to menu items other than the EZ mode menu items with easy when desired.

As has been explained, the method for managing menu functions in a mobile station of the present invention has the following advantage. An EZ mode menu is provided with menu items the user or manufacturer of the mobile station uses frequently in advance, and displayed on a display window at first, thereby permitting the user a quick and easy access to a desired menu item without going through many steps of menus for using the desired menu item.

It will be apparent to those skilled in the art that various modifications and variations can be made in the method for managing menu functions in a mobile station of the present invention without departing from the spirit or scope of the invention. Thus, it is intended that the present invention cover the modifications and variations of this invention provided they come within the scope of the appended claims and their equivalents.

What is claimed is:

1. A method for managing menu functions in a portable device, the method comprising:
fabricating an easy mode menu responsive to selection of at least one menu item of preference from a basic menu list, the basic menu list representing various menu items;
displaying a basic menu comprising a plurality of menu items and an easy menu item which corresponds to the fabricated easy mode menu, wherein the easy menu item is separate from each of the plurality of menu items, and the plurality of menu items individually correspond to a different function; and
displaying the at least one menu item of the easy mode menu when the displayed easy menu item is selected,
wherein, prior to the fabricating, the at least one menu item of the basic menu list has a depth level equal to the depth level of the plurality of menu items displayed on the basic menu.

2. The method according to claim 1, further comprising:
providing a user-selectable region for each of the menu items of the basic menu list, each of the user-selectable regions permitting a user to select the at least one menu item of preference from the basic menu list.

3. The method according to claim 2, wherein the user-selectable region for each of the menu items of the basic menu list comprises a user-selectable check box.

4. The method according to claim 3, wherein said check box is selectable via user manipulation of a button.

5. The method according to claim 3, wherein said check box is selectable via user manipulation of a keypad button.

6. The method according to claim 1, further comprising:
arranging each of the menu items of the basic menu list in a numbered list; and
enabling the selection of the at least one menu item of preference via user manipulation of a numbered key which corresponds to a number in the numbered list.

7. The method as claimed in claim 1, wherein the easy menu item comprises at least one menu item which corresponds to the basic menu.

8. The method as claimed in claim 1, wherein the fabricating of the easy mode menu is responsive to user-edits to an existing menu.

9. The method as claimed in claim 1, wherein the fabricating of the easy mode menu is responsive to statistics of frequently used menu items.

10. The method as claimed in claim 1, wherein the at least one menu item comprised in the easy mode menu is displayed in icon form.

11. The method as claimed in claim 1, wherein the basic menu list represents a hierarchical architecture of menu items.

12. A portable device, comprising:
an input component permitting user input;
a display; and
a processor for operating responsive to instructions to create an easy mode menu from a basic menu list, wherein the processor is configured to:
fabricate the easy mode menu responsive to selection of at least one menu item of preference from the basic menu list, the basic menu list representing various menu items;
cause displaying on the display a basic menu comprising a plurality of menu items and an easy menu item which corresponds to the fabricated easy mode menu, wherein the easy menu item is separate from each of the plurality of menu items, and the plurality of menu items individually correspond to a different function; and
cause displaying on the display the at least one menu item of the easy mode menu when the displayed easy menu item is selected,
wherein, prior to the fabricating, the at least one menu item of the basic menu list has a depth level equal to the depth level of the plurality of menu items displayed on the basic menu.

13. The portable device according to claim 12, wherein the processor is further configured to:
provide a user-selectable region for each of the menu items of the basic menu list, each of the user-selectable regions permitting a user to select the at least one menu item of preference from the basic menu list.

14. The portable device according to claim 13, wherein the user-selectable region for each of the menu items of the basic menu list comprises a user-selectable check box.

15. The portable device according to claim 14, wherein said check box is selectable via user manipulation of a button.

16. The portable device according to claim 14, wherein said check box is selectable via user manipulation of a keypad button.

17. The portable device according to claim 12, wherein the processor is further configured to:
arrange each of the menu items of the basic menu list in a numbered list; and
enable the selection of the at least one menu item of preference via user manipulation of a numbered key which corresponds to a number in the numbered list.

18. The portable device as claimed in claim 12, wherein the easy menu item comprises at least one menu item which corresponds to the basic menu.

19. The portable device as claimed in claim 12, wherein the fabricating of the easy mode menu is responsive to user-edits to an existing menu.

20. The portable device as claimed in claim 12, wherein the fabricating of the easy mode menu is responsive to statistics of frequently used menu items.

21. The portable device as claimed in claim 12, wherein the at least one menu item comprised in the easy mode menu is displayed in icon form.

22. The portable device as claimed in claim 12, wherein the menu list represents a hierarchical architecture of menu items.

23. A method for managing menu functions in a portable device, the method comprising:
fabricating an easy mode menu responsive to selection of at least one menu item of preference from a basic menu list;
displaying the basic menu list comprising a plurality of menu items and an easy menu item which corresponds to the fabricated easy mode menu, wherein the easy menu item is separate from each of the plurality of menu items and the plurality of menu items individually correspond to a different function; and
displaying the at least one menu item of the easy mode menu when the displayed easy menu item is selected,
wherein, prior to the fabricating, the at least one menu item of the basic menu list has a depth level equal to the depth level of the plurality of menu items displayed on the basic menu.

* * * * *